US011711747B2

(12) United States Patent
Wu et al.

(10) Patent No.: US 11,711,747 B2
(45) Date of Patent: Jul. 25, 2023

(54) MILLIMETER WAVE DIRECTIONAL DISCOVERY SIGNAL DESIGN

(71) Applicant: QUALCOMM Incorporated, San Diego, CA (US)

(72) Inventors: Zhibin Wu, Los Altos, CA (US); Junyi Li, Chester, NJ (US); Kapil Gulati, Belle Mead, NJ (US); Sudhir Kumar Baghel, Hillsborough, NJ (US); Tien Viet Nguyen, Bridgewater, NJ (US); Shailesh Patil, San Diego, CA (US); Libin Jiang, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/068,132

(22) Filed: Oct. 12, 2020

(65) Prior Publication Data

US 2021/0029620 A1    Jan. 28, 2021

Related U.S. Application Data

(63) Continuation of application No. 15/988,573, filed on May 24, 2018, now Pat. No. 10,841,862.
(Continued)

(51) Int. Cl.
H04W 48/08    (2009.01)
H04W 4/02    (2018.01)
(Continued)

(52) U.S. Cl.
CPC ............. *H04W 48/08* (2013.01); *H04L 5/001* (2013.01); *H04L 5/0048* (2013.01);
(Continued)

(58) Field of Classification Search
CPC ....... H04W 48/08; H04W 4/46; H04W 4/025; H04W 8/005; H04W 16/28;
(Continued)

(56) References Cited

U.S. PATENT DOCUMENTS 8,082,303 B2 *  12/2011  Laroia .................. H04W 4/029
                                                                    709/224
9,331,760 B2    5/2016   El Ayach et al.
(Continued)

FOREIGN PATENT DOCUMENTS

CN         103988551 A      8/2014
KR      10-2016-0144785   * 11/2016
(Continued)

OTHER PUBLICATIONS

International Preliminary Reporton Patentability—PCT/US2018/034730, The International Bureau of WIPO—Geneva, Switzerland, dated Dec. 5, 2019.
(Continued)

*Primary Examiner* — Faisal Choudhury
(74) *Attorney, Agent, or Firm* — Danai Nelisile Mhembere; Holland & Hart LLP

(57) ABSTRACT

Methods, systems, and devices for wireless communication are described. A transmitting device may select an orthogonal metric based at least in part on at least one of each direction of a plurality of directions to transmit millimeter wave discovery signals or a location parameter associated with the transmitting device. The transmitting device may transmit, in the each direction of the plurality of directions, the millimeter wave discovery signals, where the each transmitted millimeter wave discovery signal has a different orthogonal metric applied that was selected based at least in part on the at least one of the each direction or the location parameter.

22 Claims, 12 Drawing Sheets

Related U.S. Application Data

(60) Provisional application No. 62/511,855, filed on May 26, 2017.

(51) Int. Cl.

| | | |
|---|---|---|
| *H04L 5/00* | (2006.01) | |
| *H04W 8/00* | (2009.01) | |
| *H04W 4/46* | (2018.01) | |
| *H04W 16/28* | (2009.01) | |
| *H04W 64/00* | (2009.01) | |
| *H04W 72/02* | (2009.01) | |
| *H04L 5/14* | (2006.01) | |
| *H04W 4/70* | (2018.01) | |
| *H04W 84/00* | (2009.01) | |

(52) U.S. Cl.
CPC ........... *H04L 5/0098* (2013.01); *H04W 4/025* (2013.01); *H04W 4/46* (2018.02); *H04W 8/005* (2013.01); *H04W 16/28* (2013.01); *H04W 64/006* (2013.01); *H04W 72/02* (2013.01); *H04L 5/14* (2013.01); *H04W 4/70* (2018.02); *H04W 84/005* (2013.01)

(58) Field of Classification Search
CPC .... H04W 64/006; H04W 72/02; H04L 5/001; H04L 5/0048; H04L 5/0098
USPC ........................................................ 370/254
See application file for complete search history.

(56) References Cited

U.S. PATENT DOCUMENTS

| | | | |
|---|---|---|---|
| 9,363,683 B2 | 6/2016 | Raghavan et al. | |
| 9,474,013 B2 | 10/2016 | El Ayach et al. | |
| 10,841,862 B2 | 11/2020 | Wu et al. | |
| 2005/0100037 A1 | 5/2005 | Burbidge et al. | |
| 2009/0046653 A1 | 2/2009 | Singh et al. | |
| 2012/0230291 A1 | 9/2012 | Han et al. | |
| 2013/0208697 A1* | 8/2013 | Hwang | H04W 36/08 370/331 |
| 2013/0286959 A1 | 10/2013 | Lou et al. | |
| 2013/0308470 A1 | 11/2013 | Bevan et al. | |
| 2015/0117435 A1* | 4/2015 | Baldemair | H04W 56/001 375/326 |
| 2015/0249979 A1 | 9/2015 | Kim et al. | |
| 2015/0365155 A1 | 12/2015 | Subramanian et al. | |
| 2016/0014678 A1* | 1/2016 | Syed | H04W 48/16 370/338 |
| 2016/0073235 A1 | 3/2016 | Sharma et al. | |
| 2016/0127919 A1 | 5/2016 | Hui et al. | |
| 2016/0183276 A1 | 6/2016 | Marinier et al. | |
| 2016/0212666 A1 | 7/2016 | Zalzalah et al. | |
| 2016/0349365 A1* | 12/2016 | Ling | G01S 13/42 |
| 2017/0223552 A1 | 8/2017 | Roy et al. | |
| 2017/0288831 A1 | 10/2017 | Cezanne et al. | |
| 2018/0019901 A1 | 1/2018 | Choi et al. | |
| 2018/0123660 A1* | 5/2018 | Jung | H04B 7/043 |
| 2018/0249461 A1* | 8/2018 | Miao | H04B 7/15507 |
| 2019/0037466 A1 | 1/2019 | Saiwai et al. | |
| 2019/0124587 A1* | 4/2019 | Bergman | H04B 7/0617 |
| 2019/0288756 A1 | 9/2019 | Aryafar et al. | |

FOREIGN PATENT DOCUMENTS

| | | |
|---|---|---|
| WO | 2016065068 A2 | 4/2016 |
| WO | WO-2017186288 A1 | 11/2017 |

OTHER PUBLICATIONS

International Search Report and Written Opinion—PCT/US2018/034730—ISA/EPO—Jul. 24, 2018.
Miao H., et al., "Self-Organized Multi-Hop Millimeter-Wave Backhaul Network: Beam Alignment and Dynamic Routing", 2015 European Conference on Networks and Communications (EUCNC), Jan. 1, 2015 (Jan. 1, 2015), XP055243096, pp. 275-279, DOI: 10.1109/EuCNC.2015.7194083.

* cited by examiner

MILLIMETER WAVE DIRECTIONAL DISCOVERY SIGNAL DESIGN

CROSS REFERENCES

The present Application for Patent is a continuation of U.S. patent application Ser. No. 15/988,573 by W U, et al., entitled "Millimeter Wave Directional Discovery Signal Design," filed May 24, 2018, which claims the benefit of U.S. Provisional Patent Application No. 62/511,855 by W U, et al., entitled "Millimeter Wave Directional Discovery Signal Design," filed May 26, 2017, each of which is assigned to the assignee hereof, and each of which is expressly incorporated herein by reference in its entirety.

INTRODUCTION

The following relates generally to wireless communication, and more specifically to millimeter wave (mmW) directional discovery signal design.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may include or support networks used for vehicle based communications, also referred to as vehicle-to-everything (V2X), vehicle-to-vehicle (V2V) networks, cellular V2X (C-V2X) networks, or other similar networks. Vehicle based communication networks may provide always-on telematics where UEs, e.g., vehicle UEs (v-UEs), communicate directly to the network (V2N), to pedestrian UEs (V2P), to infrastructure devices (V2I), and to other v-UEs (e.g., via the network and/or directly). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

For vehicle based networks operating in mmW bands (e.g., 10-100 GHz), the discovery of neighboring vehicles is an important step to enable further V2V interactions. In some aspects, this may be solved by having an additional omni-directional antenna working in the sub-6 GHz band installed in the vehicle broadcasting discovery or probe signals. After the discovery, the vehicle can then use its mmW radio to generate, refine and track directionally transmitted beams that support high-data rate communication. However, in the stand-alone deployments of mmW V2X communications, the vehicle may only be equipped with a radio frequency (RF) chain operation at the mmW band. In this deployment, the vehicle has to achieve discovery procedures using directionally transmitted beams. As the discovery signal may be repeated in every direction, the over-the-air and resource overhead for transmitting such a signal could be large.

SUMMARY

A method of wireless communication is described. The method may include selecting an orthogonal metric based at least in part on at least one of each direction of a plurality of directions to transmit millimeter wave discovery signals or a location parameter associated with the transmitting device, and transmitting, in the each direction of the plurality of directions, the millimeter wave discovery signals, where each transmitted millimeter wave discovery signal has a different orthogonal metric applied that was selected based at least in part on the at least one of the each direction or the location parameter.

An apparatus for wireless communication is described. The apparatus may include means for selecting an orthogonal metric based at least in part on at least one of each direction of a plurality of directions to transmit millimeter wave discovery signals or a location parameter associated with the transmitting device, and transmitting, in the each direction of the plurality of directions, the millimeter wave discovery signals, where each transmitted millimeter wave discovery signal has a different orthogonal metric applied that was selected based at least in part on the at least one of the each direction or the location parameter.

Another apparatus for wireless communication is described. The apparatus may include a processor, memory in electronic communication with the processor, and instructions stored in the memory. The instructions may be operable to cause the processor to select an orthogonal metric based at least in part on at least one of each direction of a plurality of directions to transmit millimeter wave discovery signals or a location parameter associated with the transmitting device, and transmit, in the each direction of the plurality of directions, the millimeter wave discovery signals, where each transmitted millimeter wave discovery signal has a different orthogonal metric applied that was selected based at least in part on the at least one of the each direction or the location parameter.

A non-transitory computer readable medium for wireless communication is described. The non-transitory computer-readable medium may include instructions operable to cause a processor to select an orthogonal metric based at least in part on at least one of each direction of a plurality of directions to transmit millimeter wave discovery signals or a location parameter associated with the transmitting device, and transmit, in the each direction of the plurality of directions, the millimeter wave discovery signals, wherein each transmitted millimeter wave discovery signal has a different orthogonal metric applied that was selected based at least in part on the at least one of the each direction or the location parameter.

Some examples of the method, apparatus, and non-transitory computer-readable medium described above may further include processes, features, means, or instructions for identifying a response resource associated with receiving a response to a discovery signal. Some examples of the method, apparatus, and non-transitory computer-readable medium described above may further include processes, features, means, or instructions for selecting the orthogonal metric based at least in part on the response resource.

Some examples of the method, apparatus, and non-transitory computer-readable medium described above may further include processes, features, means, or instructions for identifying a travel direction associated with the transmitting device. Some examples of the method, apparatus, and non-transitory computer-readable medium described above may further include processes, features, means, or instructions for selecting the orthogonal metric based at least in part on the travel direction.

Some examples of the method, apparatus, and non-transitory computer-readable medium described above may further include processes, features, means, or instructions for identifying a location parameter associated with the transmitting device. Some examples of the method, apparatus, and non-transitory computer-readable medium described above may further include processes, features, means, or instructions for selecting the orthogonal metric based at least in part on the location parameter.

Some examples of the method, apparatus, and non-transitory computer-readable medium described above may further include processes, features, means, or instructions for identifying a transmitting device type associated with the transmitting device. Some examples of the method, apparatus, and non-transitory computer-readable medium described above may further include processes, features, means, or instructions for selecting the orthogonal metric based at least in part on the transmitting device type.

Some examples of the method, apparatus, and non-transitory computer-readable medium described above may further include processes, features, means, or instructions for identifying an identifier associated with the transmitting device. Some examples of the method, apparatus, and non-transitory computer-readable medium described above may further include processes, features, means, or instructions for selecting the orthogonal metric based at least in part on the identifier.

Some examples of the method, apparatus, and non-transitory computer-readable medium described above may further include processes, features, means, or instructions for identifying a response resource, a travel direction, a location parameter, a transmitting device type, or an identifier. Some examples of the method, apparatus, and non-transitory computer-readable medium described above may further include processes, features, means, or instructions for selecting the orthogonal metric based at least in part on the response resource, the travel direction, the transmitting device type, the identifier, or any combination thereof.

In some examples of the method, apparatus, and non-transitory computer-readable medium described above, the orthogonal metric comprises one or more of an orthogonal code, information bits, or any combination thereof.

Some examples of the method, apparatus, and non-transitory computer-readable medium described above may further include processes, features, means, or instructions for generating information bits to include in the discovery signals. Some examples of the method, apparatus, and non-transitory computer-readable medium described above may further include processes, features, means, or instructions for transmitting the information bits in the discovery signals.

In some examples of the method, apparatus, and non-transitory computer-readable medium described above, the information bits may be associated with one or more of a beam direction, a travel direction, a transmitting device type, and an identifier associated with the transmitting device.

Some examples of the method, apparatus, and non-transitory computer-readable medium described above may further include processes, features, means, or instructions for selecting the orthogonal metric from a set of available orthogonal metrics, wherein the transmitting device selects an orthogonal metric that may be different from orthogonal metrics associated with other transmitting devices.

Some examples of the method, apparatus, and non-transitory computer-readable medium described above may further include processes, features, means, or instructions for generating a temporary identifier associated with the transmitting device. Some examples of the method, apparatus, and non-transitory computer-readable medium described above may further include processes, features, means, or instructions for identifying a duration parameter associated with the temporary identifier. Some examples of the method, apparatus, and non-transitory computer-readable medium described above may further include processes, features, means, or instructions for transmitting a signal to a receiving device that indicates the temporary identifier and the duration parameter.

Some examples of the method, apparatus, and non-transitory computer-readable medium described above may further include processes, features, means, or instructions for identifying a temporary identifier associated with the transmitting device. Some examples of the method, apparatus, and non-transitory computer-readable medium described above may further include processes, features, means, or instructions for identifying a duration parameter associated with the temporary identifier. Some examples of the method, apparatus, and non-transitory computer-readable medium described above may further include processes, features, means, or instructions for transmitting a signal to a receiving device that indicates the temporary identifier and the duration parameter.

Some examples of the method, apparatus, and non-transitory computer-readable medium described above may further include processes, features, means, or instructions for generating a temporary identifier associated with the transmitting device. Some examples of the method, apparatus, and non-transitory computer-readable medium described above may further include processes, features, means, or instructions for generating a time-varying sequence based at least in part on the temporary identifier. Some examples of the method, apparatus, and non-transitory computer-readable medium described above may further include processes, features, means, or instructions for transmitting a signal including the time-varying sequence to a receiving device.

In some examples of the method, apparatus, and non-transitory computer-readable medium described above, a same temporary identifier and duration parameter may be used for different receiving devices.

In some examples of the method, apparatus, and non-transitory computer-readable medium described above, a different temporary identifier and duration parameter may be used for different receiving devices.

Some examples of the method, apparatus, and non-transitory computer-readable medium described above may further include processes, features, means, or instructions for updating, for each associated receiving device, the temporary identifier according to the duration parameter.

A method of wireless communication is described. The method may include receiving a discovery signal from a transmitting device, the discovery signal transmitted in a transmit direction using a directional transmission, identifying, based at least in part on a receive direction associated with the discovery signal, the transmit direction, selecting, based at least in part on the transmit direction and a location parameter associated with the transmitting device, an orthogonal metric to use to recover the discovery signal, and recovering the discovery signal using the selected orthogonal metric.

An apparatus for wireless communication is described. The apparatus may include means for receiving a discovery signal from a transmitting device, the discovery signal transmitted in a transmit direction using a directional transmission, means for identifying, based at least in part on a receive direction associated with the discovery signal, the transmit direction, means for selecting, based at least in part on the transmit direction or a location parameter associated with the transmitting device, an orthogonal metric to use to recover the discovery signal, and means for recovering discovery signal using the selected orthogonal metric.

Another apparatus for wireless communication is described. The apparatus may include a processor, memory in electronic communication with the processor, and instructions stored in the memory. The instructions may be operable to cause the processor to receive a discovery signal from a transmitting device, the discovery signal transmitted in a transmit direction using a directional transmission, identify, based at least in part on a receive direction associated with the discovery signal, the transmit direction, select, based at least in part on the transmit direction or a location parameter associated with the transmitting device, an orthogonal metric to use to recover the discovery signal, and recover the discovery signal using the selected orthogonal metric.

A non-transitory computer readable medium for wireless communication is described. The non-transitory computer-readable medium may include instructions operable to cause a processor to receive a discovery signal from a transmitting device, the discovery signal transmitted in a transmit direction using a directional transmission, identify, based at least in part on a receive direction associated with the discovery signal, the transmit direction, select, based at least in part on the transmit direction or a location parameter associated with the transmitting device, an orthogonal metric to use to recover the discovery signal, and recover the discovery signal using the selected orthogonal metric.

Some examples of the method, apparatus, and non-transitory computer-readable medium described above may further include processes, features, means, or instructions for identifying a location parameter associated with the receiving device. Some examples of the method, apparatus, and non-transitory computer-readable medium described above may further include processes, features, means, or instructions for selecting the orthogonal metric based at least in part on the location parameter.

Some examples of the method, apparatus, and non-transitory computer-readable medium described above may further include processes, features, means, or instructions for identifying a travel direction associated with the receiving device. Some examples of the method, apparatus, and non-transitory computer-readable medium described above may further include processes, features, means, or instructions for selecting the orthogonal metric based at least in part on the travel direction.

Some examples of the method, apparatus, and non-transitory computer-readable medium described above may further include processes, features, means, or instructions for identifying a receiving device type associated with the receiving device. Some examples of the method, apparatus, and non-transitory computer-readable medium described above may further include processes, features, means, or instructions for selecting the orthogonal metric based at least in part on the receiving device type.

Some examples of the method, apparatus, and non-transitory computer-readable medium described above may further include processes, features, means, or instructions for identifying a location parameter, a travel direction, and a receiving device type associated with the receiving device. Some examples of the method, apparatus, and non-transitory computer-readable medium described above may further include processes, features, means, or instructions for selecting the orthogonal metric based at least in part on the location parameter, the travel direction, the receiving device type, or any combination thereof.

Some examples of the method, apparatus, and non-transitory computer-readable medium described above may further include processes, features, means, or instructions for identifying a temporary identifier associated with the transmitting device and a duration parameter associated with the temporary identifier, and transmitting a signal to the transmitting device based at least in part on the identified temporary identifier and the duration parameter.

Some examples of the method, apparatus, and non-transitory computer-readable medium described above may further include processes, features, means, or instructions for generating a temporary identifier associated with the receiving device. Some examples of the method, apparatus, and non-transitory computer-readable medium described above may further include processes, features, means, or instructions for identifying a duration parameter associated with the temporary identifier. Some examples of the method, apparatus, and non-transitory computer-readable medium described above may further include processes, features, means, or instructions for transmitting a signal to a transmitting device that indicates the temporary identifier and the duration parameter.

DETAILED DESCRIPTION

Aspects of the disclosure are initially described in the context of a wireless communication system, such as a mmW wireless communication system. Generally, the described techniques support mmW discovery signals being transmitted in an orthogonal manner such that the discovery signals are transmitted in a short manner, in a manner that supports the ability to distinguish different transmitters, and may provide a mechanism to uniquely identify resources used for next-step message exchanges. In some aspects, a vehicle will send a directional discovery signal during a discovery symbol to announce its presence to other vehicles nearby. The discovery symbol may be shared by multiple vehicles and, therefore, the vehicles may transmit the discovery signals using an orthogonal metric to distinguish the transmitting devices. The orthogonal metric may include, alone or in any combination, an orthogonal code and/or bit(s) encoded into the discovery signal. In some aspects, the vehicle may use different orthogonal metrics for discovery signals transmitted in different directions. For example, a first orthogonal metric may be used for discovery signals transmitted in a first direction, a second orthogonal metric may be used for discovery signals transmitted in a second direction, and the like. Other considerations with respect to the orthogonal metric may include, but are not limited to, a rendezvous resource where the vehicle will listen for further requests (e.g., a paging request) if it is discovered by other vehicles, the travel direction of the vehicle, the location of the vehicle, the vehicle type, the vehicle's identifier, and the like. Accordingly, a receiving device may be able to receive directional discovery signals and pre-filter the orthogonal metrics (e.g., codes) which the receiving device needs to detect using the beam direction, vehicle location, travel direction, vehicle type, and the like.

Aspects of the disclosure are further illustrated by and described with reference to apparatus diagrams, system diagrams, and flowcharts that relate to mmW directional discovery signal design.

Figure 1:
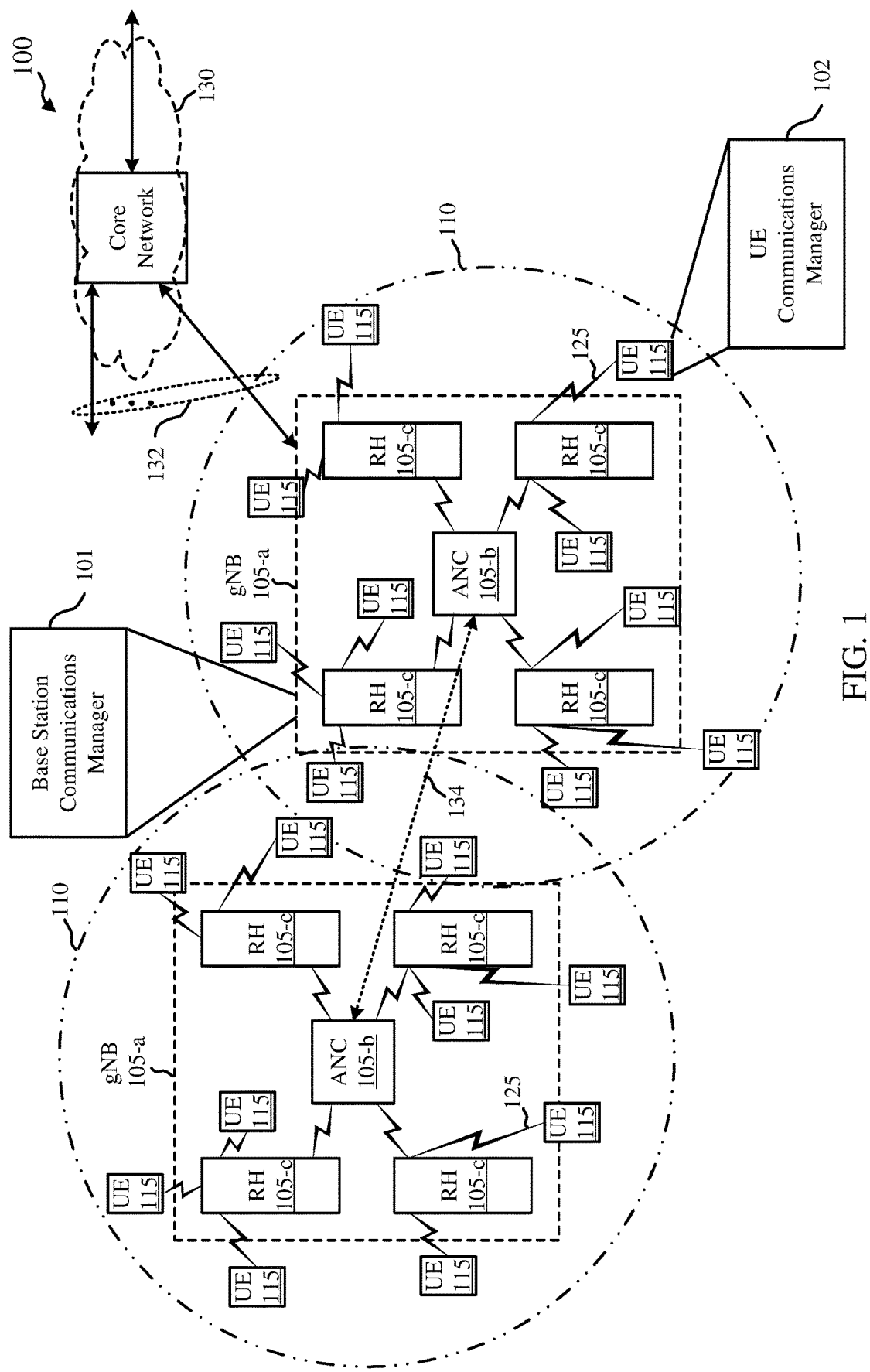
FIG. 1 illustrates an example of a system for wireless communication that supports mmW directional discovery signal design, in accordance with one or more aspects of the present disclosure.

FIG. 1 illustrates an example of a wireless communication system 100, in accordance with one or more aspects of the present disclosure. The wireless communication system 100 includes base stations 105 (e.g., gNodeBs (gNBs) 105-a, and/or radio heads (RHs) 105-c), UEs 115, and a core network 130. In some examples, the wireless communication system 100 may be an LTE, LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. Control information and data may be multiplexed on an uplink channel or a downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, a vehicle (e.g., v-UE), or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

Base stations 105 may perform radio configuration and scheduling for communication with UEs 115, or may operate under the control of a base station controller (not shown). In some examples, base stations 105 may be macro cells, small cells, hot spots, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

The core network 130 may provide user authentication, access authorization, tracking, Internet Protocol (IP) connectivity, and other access, routing, or mobility functions. At least some of the network devices, such as base station 105-*a* may include subcomponents such as an access network entity 105-*b*, which may be an example of an access node controller (ANC). Each access network entity 105-*b* may communicate with a number of UEs 115 through a number of other access network transmission entities 105-*c*, each of which may be an example of a smart radio head, or a transmission/reception point (TRP). In some configurations, various functions of each access network entity or base station 105 may be distributed across various network devices (e.g., radio heads 105-*c* and access network controllers 105-*b*) or consolidated into a single network device (e.g., a base station 105).

A base station 105 may be connected by an S1 interface to the core network 130. The core network 130 may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communication system 100 may be a packet-based network that operates according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARM) to provide retransmission at the MAC layer to improve link efficiency. In the control plane, the radio resource control (RRC) protocol layer may provide establishment, configuration, and maintenance of an RRC connection between a UE 115 and a network device 105-*c*, network device 105-*b*, or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30{,}720{,}000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Wireless communication system 100 may include or support networks used for vehicle based communications, also referred to as V2X, V2V networks, and/or C-V2X networks. Vehicle based communication networks may provide always-on telematics where user equipment (UE)s, e.g., v-UEs, communicate directly to V2N, to V2P, to V2I, and to other v-UEs (e.g., directly and/or via the network).

In some aspects, references to a transmitting device may refer to a UE 115 and/or a base station 105, when such device is configured to transmit discovery signals in accordance with the described techniques. Similarly, references to a receiving device may refer to a UE 115 and/or a base station 105, when such device is configured to receive discovery signals in accordance with the described techniques.

In some aspects, a base station 105 may include a base station communications manager 101 and a UE 115 may include UE communications manager 102. When the base station 105 and/or UE 115 is configured as a transmitting device, base station communications manager 101 and/or UE communications manager 102 may identify a plurality of directions to transmit millimeter wave discovery signals. Base station communications manager 101 and/or UE communications manager 102 may select, for each direction of the plurality of directions, an orthogonal metric to apply to each millimeter wave discovery signal, where each direction is associated with a different orthogonal metric. Base station communications manager 101 and/or UE communications manager 102 may transmit, in each direction of the plurality of directions, the millimeter wave discovery signals where each transmitted millimeter wave discovery signal has a different orthogonal metric applied that was selected based on the direction.

In some aspects, when the base station 105 and/or the UE 115 is configured as a receiving device, the base station communications manager 101 and/or UE communications manager 102 may receive a discovery signal from a transmitting device, the discovery signal transmitted in a transmit direction using a directional transmission. Base station communications manager 101 and/or UE communications manager 102 may identify, based at least in part on a receive direction associated with the discovery signal, the transmit direction. Base station communications manager 101 and/or UE communications manager 102 may select, based at least in part on the transmit direction, an orthogonal metric to use to recover the discovery signal. Base station communications manager 101 and/or UE communications manager 102 may recover the discovery signal using the selected orthogonal metric.

Figure 2:
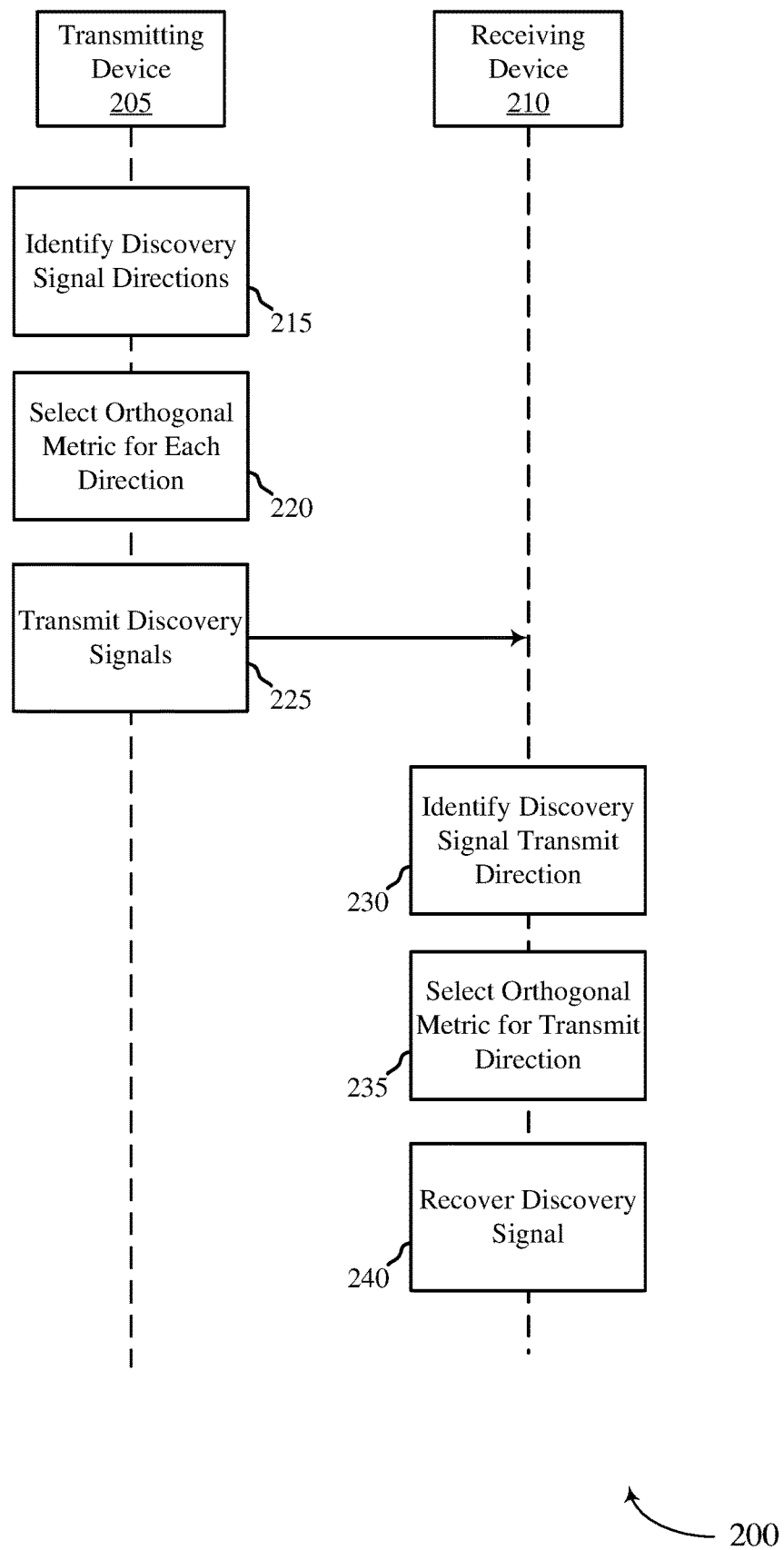
FIG. 2 illustrates an example of a process that supports mmW directional discovery signal design, in accordance with one or more aspects of the present disclosure.

FIG. 2 illustrates an example of a process 200 that supports mmW directional discovery signal design, in accordance with one or more aspects of the present disclosure. In some examples, process 200 may implement aspects of wireless communication system 100. Process 200 may include a transmitting device 205 and a receiving device 210, which may be examples of a base station 105 and/or UE 115 as is described herein. Generally, process 200 illustrates one example of transmitting device 205 using different orthogonal metrics for directional discovery signals transmitted in multiple directions.

At 215, transmitting device 205 may identify discovery signal directions. For example, transmitting device 205 may identify the directions that mmW discovery signals are being transmitted. The mmW discovery signals may be transmitted in a plurality of directions that generally cover a geographic area surrounding transmitting device 205. The mmW discovery signals may be transmitted in a circular manner, e.g., in a first direction, then a second direction, and so forth. The mmW discovery signals may be transmitted to allow neighboring devices (e.g., v-UEs) to determine that transmitting device 205 is nearby and, in some aspects, provide sufficient information to support communications between transmitting device 205 and the neighboring devices. The mmW discovery signals may be transmitted in a beamforming manner. The mmW discovery signals may be transmitted in a predetermined and/or dynamically selected number of directions, e.g., 2, 4, 8, 12, 24, 32, 64, etc.

At 220, transmitting device 205 may select an orthogonal metric for each transmit direction. For example, transmitting device 205 may select, for each direction that the mmW discovery signal will be transmitted in, an orthogonal metric to apply to the mmW discovery signals. Accordingly, each transmit direction may have a different orthogonal metric applied. In some aspects, the orthogonal metric may include an orthogonal code (e.g., a Walsh code, Zadoff-Chu sequence, and the like) and/or a number of bit(s) encoded on the discovery signal. In one non-limiting example, the orthogonal metric may include applying an orthogonal code to each discovery signal and encoding bits in the discovery signal relating to the transmit beam direction, the travel direction of transmitting device 205, a location parameter, a transmitting device type (e.g., a vehicle type), a transmitting device identifier, and the like.

In some aspects, orthogonal metrics that transmitting device 205 selects are from a set of available orthogonal metrics. In some examples, different transmitting devices may have different orthogonal metrics available such that no two transmitting devices would use the same orthogonal metrics.

In some aspects, there may be a large space of code sequence which contain M orthogonal metrics (e.g., orthogonal codes), where M is an integer. There may be N transmitting devices that need to select an orthogonal metric, where N is an integer. If M is much larger than N, then the selection strategy may include multiplexing (e.g., CDM) the mmW discovery signals based on the transmitting device's radio transmission direction (beam direction), the selected "rendezvous" resource where the transmitting device may listen for further "requests" (e.g., a page request) if it is discovered by any devices and the like. In some aspects, the mmW discovery signals may be further multiplexed based on the transmitting device's driving direction (e.g., the travel direction of the vehicle, orientation of the vehicle's windshield, if not moving, or the like), the transmitting device's location (e.g., an area (e.g., a section of highway) may be divided into a lattice grid, and the vehicle belongs to one of the grids and a particular set of subspace of M is allocated in each grid), the transmitting device type (e.g., a car, a truck, a bike, or the like), the transmitting device's own unique identifier, and the like. In some cases, the mmW discovery signals may be multiplexed based on the beam direction, the selected "rendezvous" resource, the driving direction, the location, the device type, the unique identifier, or the like in an order of preference determined by the network, the transmitting device, a user, or the like.

In the situation in which M (e.g., codes, data, messages, or the like) or P (e.g., a size of a preamble, a sequence, or the like) is in the same order of N, where P is an integer, it may not be possible to select a different orthogonal resource or code to represent all the considerations above. In this case, transmitting device 205 may select an orthogonal resource or code based on transmitting device's radio transmission direction (beam direction), the selected "rendezvous" resource where the transmitting device 205 may listen for further "requests" (e.g., a page request) if it is discovered by any vehicles, and the like. Additionally, transmitting device 205 may try to encode/scramble additional information (e.g., the considerations described above) with some information bits onto the orthogonal metric (e.g., a predetermined Zadoff Chu sequence). That is, regardless of M/P relationship, some information may be presented as a different selection of codes/sequences, but some extra information may be encoded as bits embedded in the mmW discovery signal. The M/P relationship may relate to trade-off considerations associated with including preambles and/or messages associated with transmitting device 205 in configuring the discovery signals. For example, a discovery signal may be configured to include only a preamble P (e.g., an orthogonal sequence), and thus, no messages M. In such cases, there may be a low resource overhead in transmitting the discovery signal, however, the discovery signal lacks the messages representing information (e.g., the beam direction, the selected "rendezvous" resource, the driving direction, the location, the device type, the unique identifier, or the like) that can be helpful in a discovery procedure associated with transmitting device 205. In another example, a discovery signal may be configured to include only messages (e.g., codes in bits). In such cases, the discovery signal contains messages or codes representing all or most of the information that can be helpful in the discovery procedure, however, the resource overhead in transmitting the discovery signal may be too high. In the present disclosure a discovery signal may be configured to include both preambles and messages organized together in a wave form, and thus, balancing the trade-offs between the resource overhead and the amount of the information transmitted. As such, regardless of the M/P relationship, some information may be represented by the wave form while other information may be embedded as information bits in the discovery signal, thereby providing a receiving device the information that may be helpful for a successful discovery of transmitting device 205.

Accordingly, transmitting device 205 may identify a response resource (e.g., rendezvous resource) associated with receiving a response to a discovery signal and select the orthogonal metric based at least in part on the response resource. The transmitting device 205 may identify a travel direction associated with the transmitting device 205 and select the orthogonal metric based at least in part on the travel direction. The transmitting device 205 may identify a location parameter associated with the transmitting device 205 and select the orthogonal metric based at least in part on the location parameter. The transmitting device 205 may identify a transmitting device type and select the orthogonal metric based at least in part on the transmitting device type. The transmitting device 205 may identify an identifier associated with the transmitting device 205 and select the orthogonal metric based at least in part on the identifier. The transmitting device 205 may identify a response resource, a travel direction, a location parameter, a transmitting device type, and an identifier and select the orthogonal metric based at least in part on the response resource, the travel direction, the location parameter, the transmitting device type, the identifier, or any combination thereof.

At 225, transmitting device 205 may transmit (and receiving device 210 may receive) a directional discovery signal. As discussed, each of the transmitted mmW discovery signals may have a different orthogonal metric applied. The orthogonal metric may be selected based on the direction that the mmW discovery signal was transmitted.

At 230, receiving device 210 may identify the discovery signal transmit direction. For example, the receiving device 210 may identify the receive direction (e.g., angle of arrival) of the mmW discovery signal and, based on the receive direction, determine or otherwise determine which direction that the mmW discovery signal was transmitted.

At 235, receiving device 210 may select an orthogonal metric for the transmit direction. For example, the receiving device 210 may select an orthogonal metric to use to recover the mmW discovery signal. As discussed above, each mmW discovery signal may be transmitted in a direction that has an orthogonal metric applied based on the direction. Receiving device 210 may know, e.g., via preconfigured information, via signaling from a base station or network device, etc., which orthogonal metric is applied to mmW discovery signals transmitted in the transmit direction and use this information to select the orthogonal metric.

At 240, receiving device 210 may recover the discovery signal using the selected orthogonal metric. As one example, the receiving device 210 may select an orthogonal code based on the transmit direction, use the orthogonal code to recover the mmW discovery signal, and then decode the bit(s) encoded in the mmW discovery signal to recover the remaining portions of the mmW discovery signal. As another example, the receiving device 210 may use an orthogonal code to recover the mmW discovery signal. As yet another example, the receiving device 210 may decode the bit(s) encoded in the mmW discovery signal to recover the mmW discovery signal.

In some aspects, receiving device 210 may support signal differentiation that addresses privacy concerns. For example, if the receiving device 210 uses an omni-directional antenna to receive the discovery signal, it may not need to sweep. After detecting a discovery signal and determining which orthogonal metric is applied to the transmitted discovery signal, receiving device 210 may determine how to reach the transmitter (in which direction) by decoding the information encoded in the discovery signal, e.g., the transmit direction, the "rendezvous" resource, etc. When receiving device 210 uses a directional antenna to conduct a sweeping operation and detect discovery signals, then in each direction, the receiving device 210 may prefilter the orthogonal metric (e.g., orthogonal codes) to recover the discovery signal using, for example, the vehicle's radio transmission direction (beam direction), the vehicle's location, the vehicle's driving direction, the vehicle type, and the like.

Figure 3:
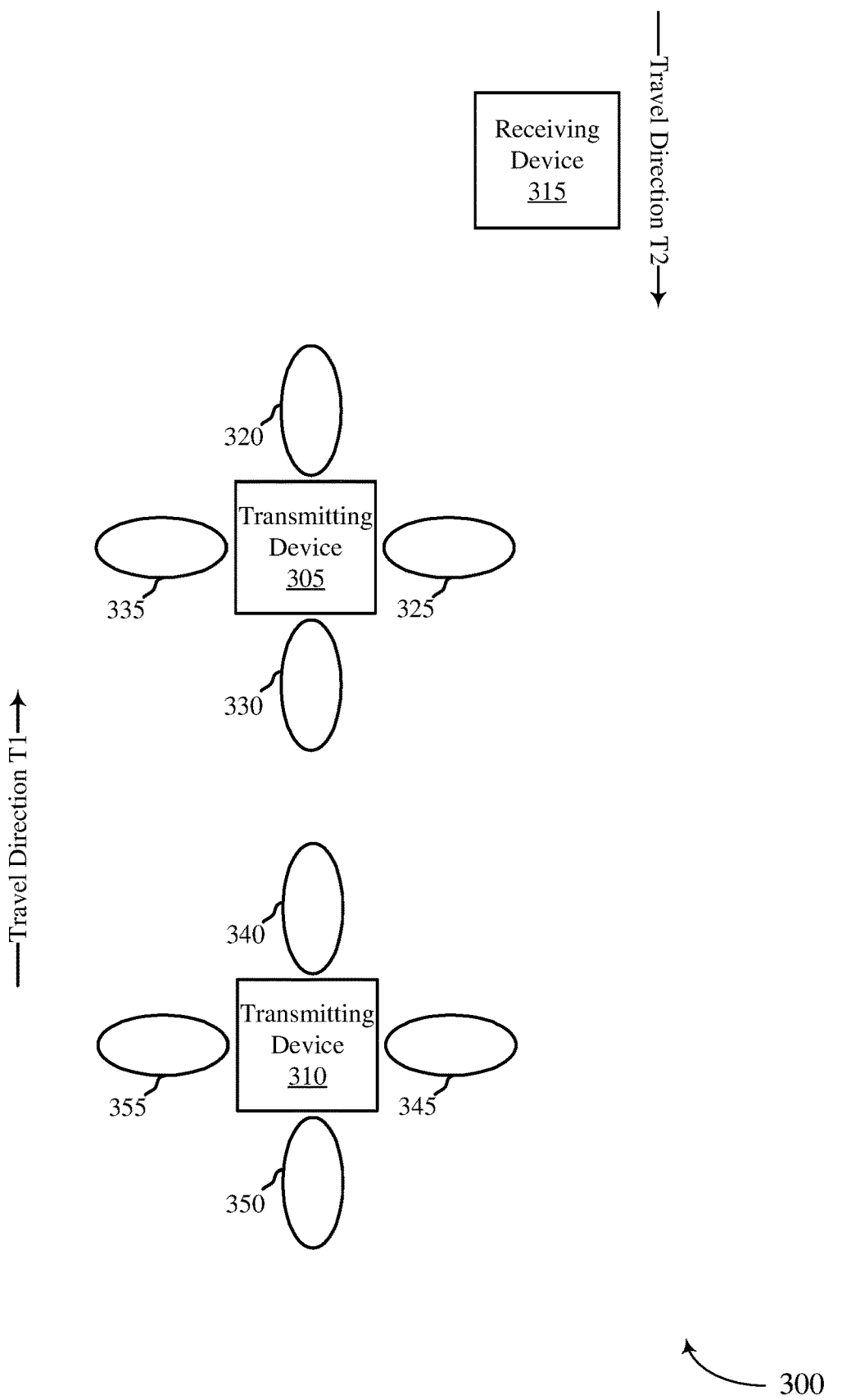
FIG. 3 illustrates an example of a system for wireless communication that supports mmW directional discovery signal design, in accordance with one or more aspects of the present disclosure.

FIG. 3 illustrates an example of a wireless communication system 300 that supports mmW directional discovery signal design, in accordance with one or more aspects of the present disclosure. In some examples, wireless communication system 300 may implement aspects of wireless communication system 100 and/or process 200. Wireless communication system 300 may include a transmitting device 305, a transmitting device 310, and a receiving device 315. The transmitting devices 305 and 310 and the receiving device 315 may be examples of a base station and/or a UE, as described herein. As one non-limiting example, the transmitting devices 305 and 310 and the receiving device 315 may be v-UEs.

Generally, wireless communication system 300 illustrates an example where transmitting devices 305 and 310 are traveling along the indicated travel direction T1 and are transmitting discovery signals 320/325/330/335 and 340/345/350/355, respectively. Receiving device 315 may be traveling along the indicated travel direction T2 and monitoring for discovery signals from other devices. In one example, transmitting devices 305 and 310 and receiving device 315 are traveling along opposite directions of a highway.

The discovery signals being transmitted by transmitting devices 305 and/or 310 may be mmW discovery signals configured according to aspects of the present disclosure. For example, transmitting device 305 may select and apply a first orthogonal metric to the discovery signal 320, a second orthogonal metric to the discovery signal 325, a third orthogonal metric to the discovery signal 330, and a fourth orthogonal metric to the discovery signal 335. Similarly, transmitting device 310 may select and apply a first orthogonal metric to the discovery signal 340, a second orthogonal metric to the discovery signal 345, a third orthogonal metric to the discovery signal 350, and a fourth orthogonal metric to the discovery signal 355. In some aspects, the orthogonal metrics applied by transmitting device 305 may be different from the orthogonal metrics applied by transmitting devices 310. That is, different sets of orthogonal metrics may be available to transmitting devices 305 and 310. As discussed above, the orthogonal metric may include an orthogonal code and/or bit(s) encoded in the discovery signals.

The discovery signals may be transmitted in the same symbol and/or in different signals. When transmitted in the same symbol and in the same direction, the discovery signals may be further distinguished based on different orthogonal metrics being applied, based on the information included in the discovery signal, and the like.

Although FIG. 3 illustrates discovery signals being transmitted in four directions, it is to be understood that transmitting devices 305 and/or 310 may transmit discovery signals in fewer or more directions. For each direction and based on the direction, a different orthogonal metric may be applied.

In some aspects, transmitting device 305 may be considered a receiving device with respect to transmitting device 310, and vice versa. That is, transmitting device 305 may detect the presence of transmitting device 310 based on discovery signal 340. Additionally, receiving device 315 may, in addition to monitoring for discovery signals from other devices, be transmitting discovery signals. In this context, transmitting devices 305 and/or 310 may be considered receiving devices with respect to receiving device 315.

Receiving device 315 may receive the discovery signals transmitted by transmitting devices 305 and/or 310, provided receiving device 315 is in coverage range of the transmitting devices 305 and/or 310. Receiving device 315 may recover the discovery signals based on the transmit direction and the orthogonal metric associated with the transmit direction. For example, receiving device 315 may know (e.g., based on preconfigured information, based on signaling, etc.) which orthogonal metric may be associated with a particular transmit direction and/or a particular transmitting device. The receiving device 315 may further decode bit(s) encoded in the discovery signals to recover the discovery signals.

In some aspects, transmitting devices 305 and/or 310 and/or receiving device 315 may support aspects of signal differentiation that supports privacy concerns. For example, although the reception of the mmW discovery signal (e.g., V2V discovery signal) is directional, it may be possible that multiple signals are received in a particular direction and among those signals, a UE 115 may need to be able to discern which signal is from which particular vehicle. If the UE 115 has already established a link to one of the vehicles in such a direction, it does not need to process such a discovery signal again (e.g., establish a duplicate link with the same vehicle). However, establishing a new link with another UE 115 may create privacy concerns.

To address such privacy concerns, without disclosing an ever-lasting (permanent) identifier that can be tracked and/or staked by a stranger vehicle, the solution may be to have a time-varying bits based on a "temporary ID" that is periodically refreshed. For example, if there are 4 vehicles A, B, C, and D in proximity to one another. Vehicles A and C may have a link to vehicle B, but vehicle D does not have a link to vehicle B. Vehicle B may generate a temporary ID once every X seconds, minutes, etc., where X is an integer. X may be independent of whether any other vehicles have connected with vehicle B or not. In general, X may be a system-wide parameter preconfigured by the network or may dynamically change. In some instances, different vehicles may choose different values of X. Vehicle B may or may not change its value of X with respect to the vehicles it encounters.

Vehicle B may transmit its temporary ID directly so that its discovery signal is constant from an interval of X, and then change according to the interval. Alternatively, it can generate a time-varying sequence using this temporary ID so that the discovery signal is time-varying each and every time. If vehicle A connects with vehicle B, vehicle B may inform vehicle A of its current temporary ID so that vehicle B can recognize vehicle A's discovery signal before the current temporary ID expires. As such, during the interval X (e.g, a time interval between 0 and X), vehicle B can inform vehicle A of its temporary ID for the next K X-interval. Accordingly, vehicle A may know that the temporary ID will be valid for up to K*X. In some instances, vehicle B may inform vehicle A of K1 and inform a different value K2 to vehicle C, where K1 is not equal to K2. In some examples, vehicle B may determine that K=0, and thus, vehicle B's temporary ID will be considered a new vehicle to vehicles A or C, and not recognizable. As vehicle D has never connected with vehicle B, vehicle D may only see some time-varying signals and vehicle D cannot recognize whether they come from the same or different vehicles.

Figure 4:
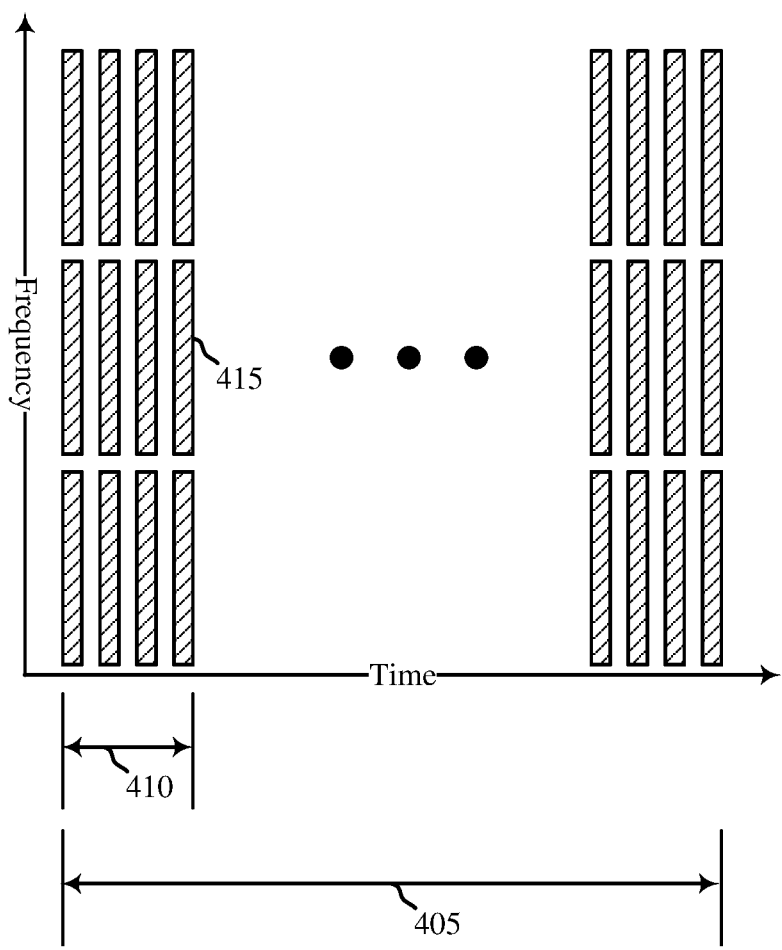
FIG. 4 illustrates an example of a frame structure that supports mmW directional discovery signal design, in accordance with one or more aspects of the present disclosure.

FIG. 4 illustrates an example of a frame structure 400 that supports mmW directional discovery signal design, in accordance with one or more aspects of the present disclosure. In some examples, frame structure 400 may implement aspects of wireless communication systems 100 and/or 300 and/or process 200.

Generally, frame structure 400 illustrates a discovery frame 405 that includes multiple discovery slots 410. Each discovery slot 410 may have multiple discovery symbols 415. Each discovery symbol 415 may include a symbol period and one subcarrier or frequency. Each discovery symbol 415 may be used by one or more transmitting devices in accordance with aspects of the present disclosure. For example, two or more transmitting devices may transmit mmW discovery signals during the same discovery symbol 415. The discovery signals may be distinguishable based on the described multiplexing techniques, e.g., each discovery signal may have a unique orthogonal metric applied.

In some aspects, the basic unit is the discovery symbol 415 in which a vehicle may send a directionally transmitted discovery signal to announce its presence to other vehicles nearby. However, each discovery symbol 415 may be shared by multiple vehicles at the same time. Hence, in some aspects different vehicles may try to use a different discovery symbols 415 and/or use a discovery signal orthogonal to each other, even when they share the same discovery symbol in the time- and frequency-dimensions. For example, the orthogonal metric (e.g., Walsh code or Zadoff-Chu sequence) may be used. That is, the discovery signals may be multiplexed using CDM so that they can be decoded individually by a receiving vehicle.

Figure 5:
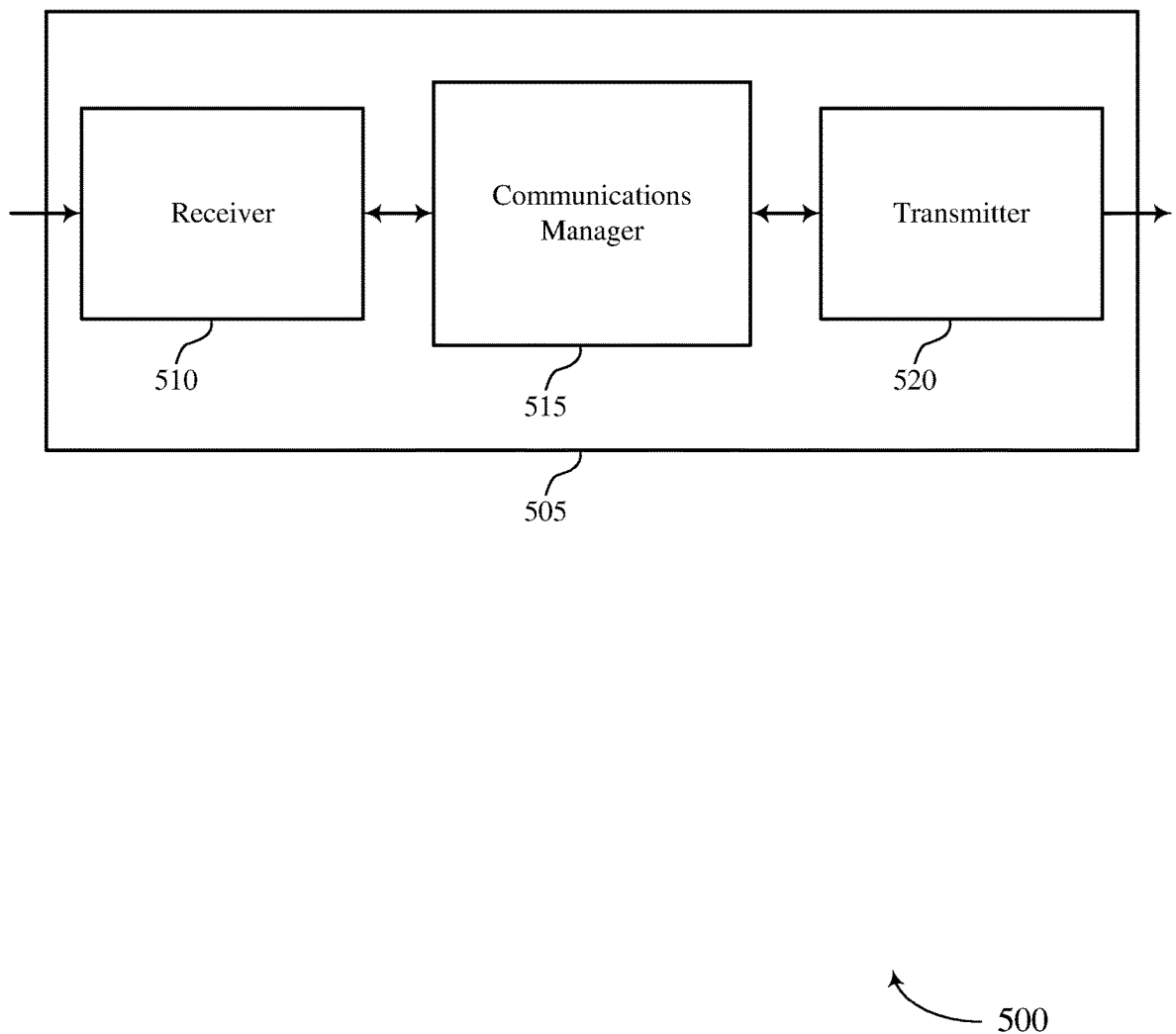
FIGS. 5 through 7 show block diagrams of a device that supports mmW directional discovery signal design, in accordance with one or more aspects of the present disclosure.

FIG. 5 shows a block diagram 500 of a wireless device 505 that supports mmW directional discovery signal design, in accordance with one or more aspects of the present disclosure. Wireless device 505 may be an example of aspects of a UE 115 or base station 105 as described herein. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to mmW directional discovery signal design, etc.). Information may be passed on to other components of the device. Receiver 510 may be an example of aspects of transceiver 835 described with reference to FIG. 8. Receiver 510 may utilize a single antenna or a set of antennas.

Communications manager 515 may be an example of aspects of the communications manager 815 described with reference to FIG. 8.

Communications manager 515 and/or at least some of its various sub-components may be implemented in hardware, software executed by a processor, firmware, or any combination thereof. If implemented in software executed by a processor, the functions of communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. Communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

When configured as a transmitting device, communications manager 515 may identify a plurality of directions to transmit millimeter wave discovery signals. Communications manager 515 may select, for each direction of the plurality of directions, an orthogonal metric to apply to each millimeter wave discovery signal, where each direction is associated with a different orthogonal metric. Communications manager 515 may transmit, in each direction of the plurality of directions, the millimeter wave discovery signals where each transmitted millimeter wave discovery signal has a different orthogonal metric applied that was selected based on the direction. When configured as a receiving device, communications manager 515 may receive a discovery signal from a transmitting device, the discovery signal transmitted in a transmit direction using a directional transmission. Communications manager 515 may identify, based on a receive direction associated with the discovery signal, the transmit direction. Communications manager 515 may select, based on the transmit direction, an orthogonal metric to use to recover the discovery signal. Communications manager 515 may recover the discovery signal using the selected orthogonal metric.

Transmitter 520 may transmit signals generated by other components of the device. In some examples, the transmitter 520 may be collocated with a receiver 510 in a transceiver module. For example, transmitter 520 may be an example of aspects of the transceiver 835 described with reference to FIG. 8. Transmitter 520 may utilize a single antenna or a set of antennas.

Figure 6:
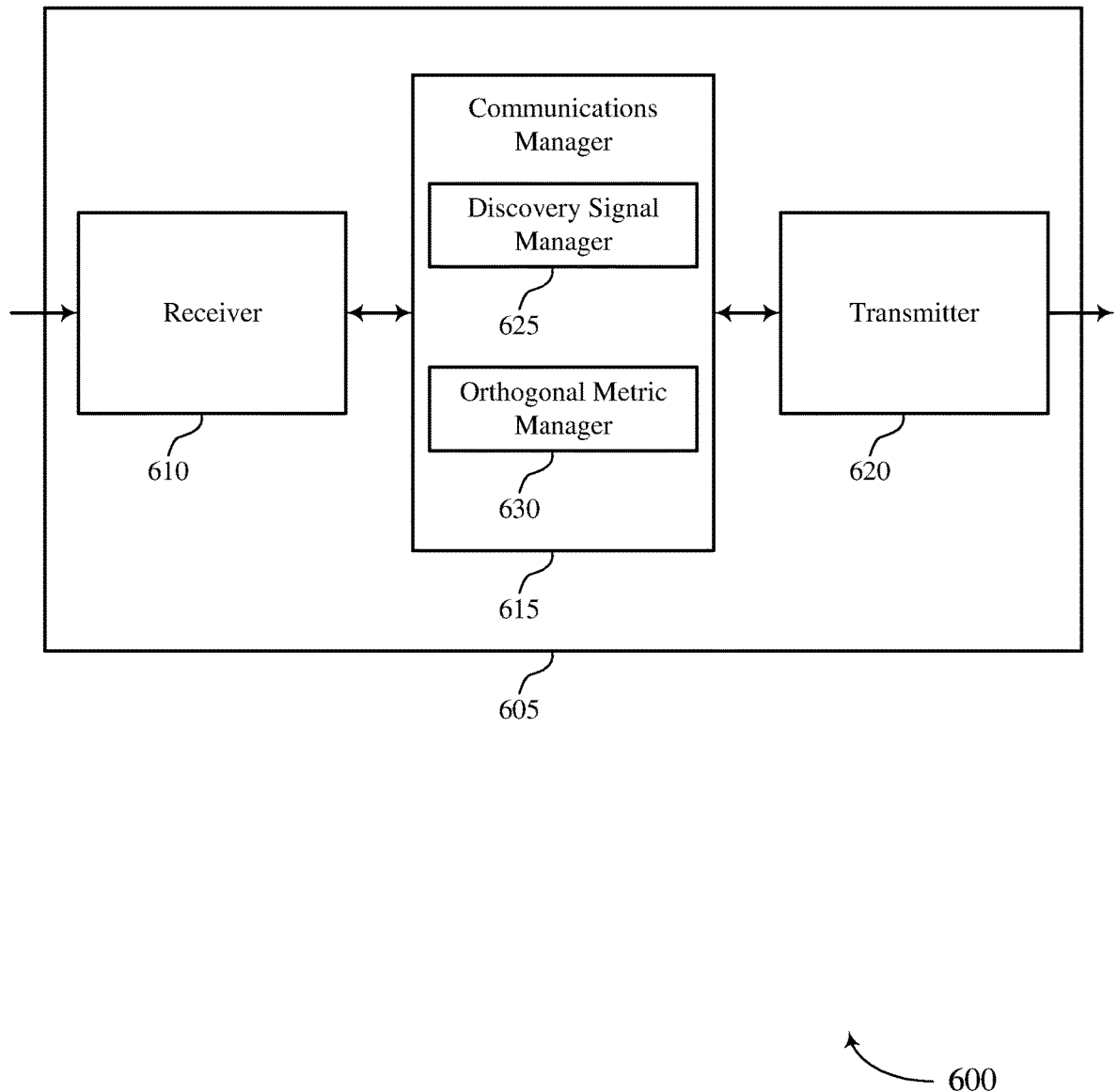

FIG. 6 shows a block diagram 600 of a wireless device 605 that supports mmW directional discovery signal design, in accordance with one or more aspects of the present disclosure. Wireless device 605 may be an example of aspects of a wireless device 505 or a UE 115 or base station 105 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to mmW directional discovery signal design, etc.). Information may be passed on to other components of the device. Receiver 610 may be an example of aspects of the transceiver 835 described with reference to FIG. 8. Receiver 610 may utilize a single antenna or a set of antennas.

Communications manager 615 may be an example of aspects of the communications manager 815 described with reference to FIG. 8. Communications manager 615 may also include discovery signal manager 625 and orthogonal metric manager 630.

Discovery signal manager 625 may identify a plurality of directions to transmit millimeter wave discovery signals. Discovery signal manager 625 may transmit, in each direction of the plurality of directions, the millimeter wave discovery signals where each transmitted millimeter wave discovery signal has a different orthogonal metric applied that was selected based on the direction. Discovery signal manager 625 may receive a discovery signal from a transmitting device, the discovery signal transmitted in a transmit direction using a directional transmission. Discovery signal manager 625 may identify, based on a receive direction associated with the discovery signal, the transmit direction.

Orthogonal metric manager 630 may select, for each direction of the plurality of directions, an orthogonal metric to apply to each millimeter wave discovery signal, where each direction is associated with a different orthogonal metric. Orthogonal metric manager 630 may select, based on the transmit direction, an orthogonal metric to use to recover a discovery signal. Orthogonal metric manager 630 may recover the discovery signal using the selected orthogonal metric.

Transmitter 620 may transmit signals generated by other components of the device. In some examples, transmitter 620 may be collocated with a receiver 610 in a transceiver module. For example, transmitter 620 may be an example of aspects of the transceiver 835 described with reference to FIG. 8. Transmitter 620 may utilize a single antenna or a set of antennas.

Figure 7:
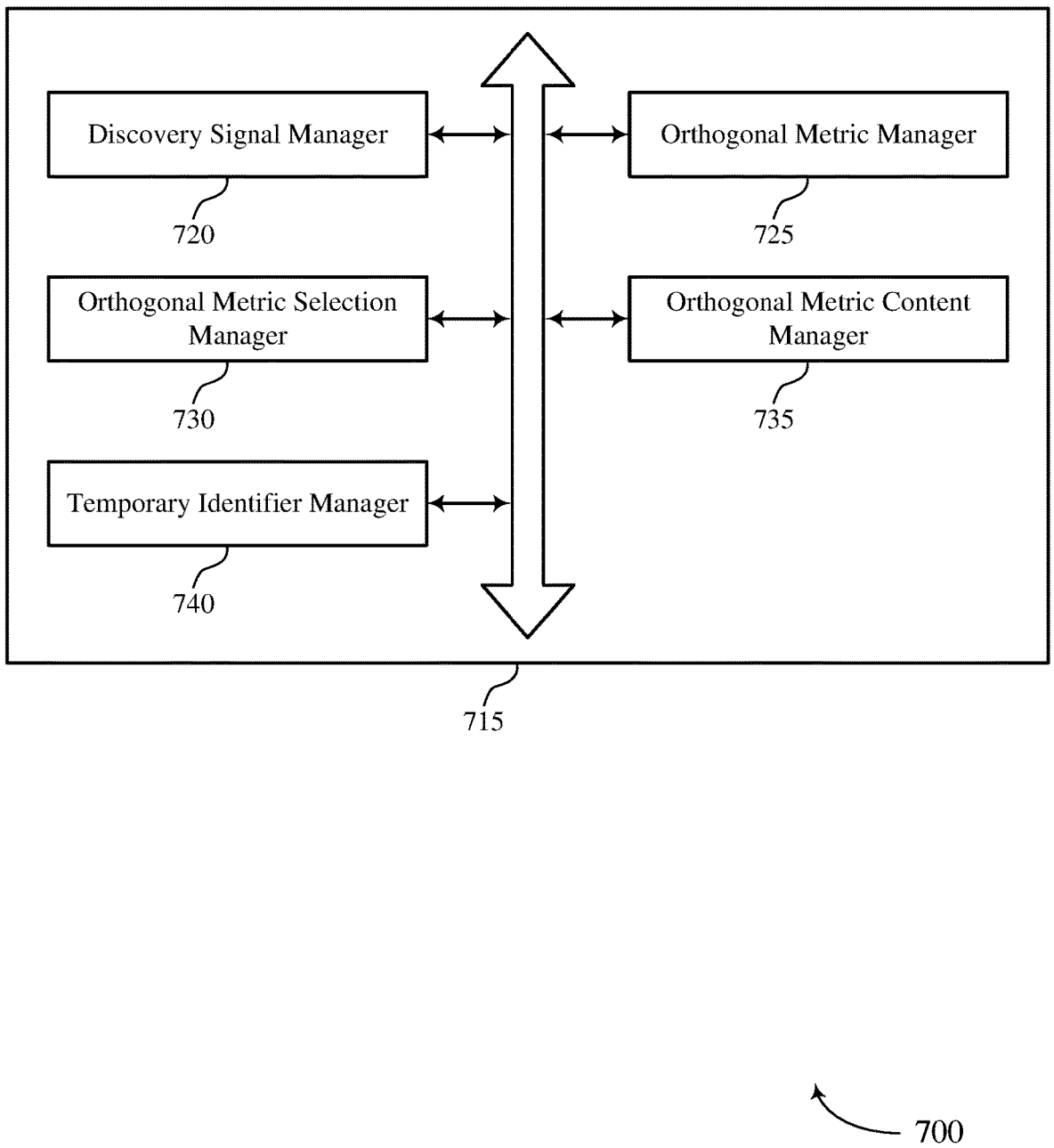

FIG. 7 shows a block diagram 700 of a communications manager 715 that supports mmW directional discovery signal design, in accordance with one or more aspects of the present disclosure. Communications manager 715 may be an example of aspects of communications manager 515, 615, or 815 described with reference to FIGS. 5, 6, and 8. Communications manager 715 may include discovery signal manager 720, orthogonal metric manager 725, orthogonal metric selection manager 730, orthogonal metric content manager 735, and temporary identifier manager 740. Each of these modules may communicate, directly or indirectly, with one another (e.g., via one or more buses).

Discovery signal manager 720 may identify a plurality of directions to transmit millimeter wave discovery signals. Discovery signal manager 720 may transmit, in each direction of the plurality of directions, the millimeter wave discovery signals where each transmitted millimeter wave discovery signal has a different orthogonal metric applied that was selected based on the direction. Discovery signal manager 720 may receive a discovery signal from a transmitting device, the discovery signal transmitted in a transmit direction using a directional transmission. Discovery signal manager 720 may identify, based on a receive direction associated with the discovery signal, the transmit direction.

Orthogonal metric manager 725 may select, for each direction of the plurality of directions, an orthogonal metric to apply to each millimeter wave discovery signal, where each direction is associated with a different orthogonal metric. Orthogonal metric manager 725 may select, based on the transmit direction, an orthogonal metric to use to recover a discovery signal. Orthogonal metric manager 725 may recover the discovery signal using the selected orthogonal metric.

Orthogonal metric selection manager 730 may identify a response resource associated with receiving a response to a discovery signal. Orthogonal metric selection manager 730 may select the orthogonal metric based on the location parameter, the travel direction, the receiving device type, or any combination thereof. Orthogonal metric selection manager 730 may identify a travel direction associated with the transmitting device. Orthogonal metric selection manager 730 may select the orthogonal metric based on the travel direction. Orthogonal metric selection manager 730 may identify a location parameter associated with the transmitting device. Orthogonal metric selection manager 730 may select the orthogonal metric based on the location parameter. Orthogonal metric selection manager 730 may identify a transmitting device type and select the orthogonal metric based on the transmitting device type. Orthogonal metric selection manager 730 may identify an identifier associated with the transmitting device and select the orthogonal metric based on the identifier. Orthogonal metric selection manager 730 may select the orthogonal metric based on the response resource. Orthogonal metric selection manager 730 may select the orthogonal metric based on the response resource, the travel direction, the location parameter, the transmitting device type, the identifier, or any combination thereof. Orthogonal metric selection manager 730 may identify a location parameter associated with the receiving device. Orthogonal metric selection manager 730 may identify a travel direction associated with the receiving device. Orthogonal metric selection manager 730 may identify a receiving device type associated with the receiving device and select the orthogonal metric based on the receiving device type. Orthogonal metric selection manager 730 may identify a location parameter, a travel direction, and a receiving device type associated with the receiving device, and identify a response resource, a travel direction, a location parameter, a transmitting device type, and an identifier.

Orthogonal metric content manager 735 may identify information bits to include in the discovery signals. Orthogonal metric content manager 735 may encode and transmitting the information bits in the discovery signals. Orthogonal metric content manager 735 may select the orthogonal metric from a set of available orthogonal metrics, where the transmitting device selects an orthogonal metric that is different from orthogonal metrics associated with other transmitting devices. In some cases, the orthogonal metric includes one or more of an orthogonal code, information bits, or any combination thereof. In some cases, the information bits are associated with one or more of a beam direction, a travel direction, a location parameter, a transmitting device type, and an identifier associated with the transmitting device.

Temporary identifier manager 740 may identify a temporary identifier associated with the transmitting device. Temporary identifier manager 740 may identify a duration parameter associated with the temporary identifier. Temporary identifier manager 740 may transmit a signal to a receiving device that indicates the temporary identifier and the duration parameter. Temporary identifier manager 740 may update, for each associated receiving device, the temporary identifier according to the duration parameter. Temporary identifier manager 740 may identify a temporary identifier associated with the receiving device, and transmit a signal to a transmitting device that indicates the temporary identifier and the duration parameter. In some cases, a same temporary identifier and duration parameter is used for different receiving devices. In some cases, a different temporary identifier and duration parameter is used for different receiving devices.

Figure 8:
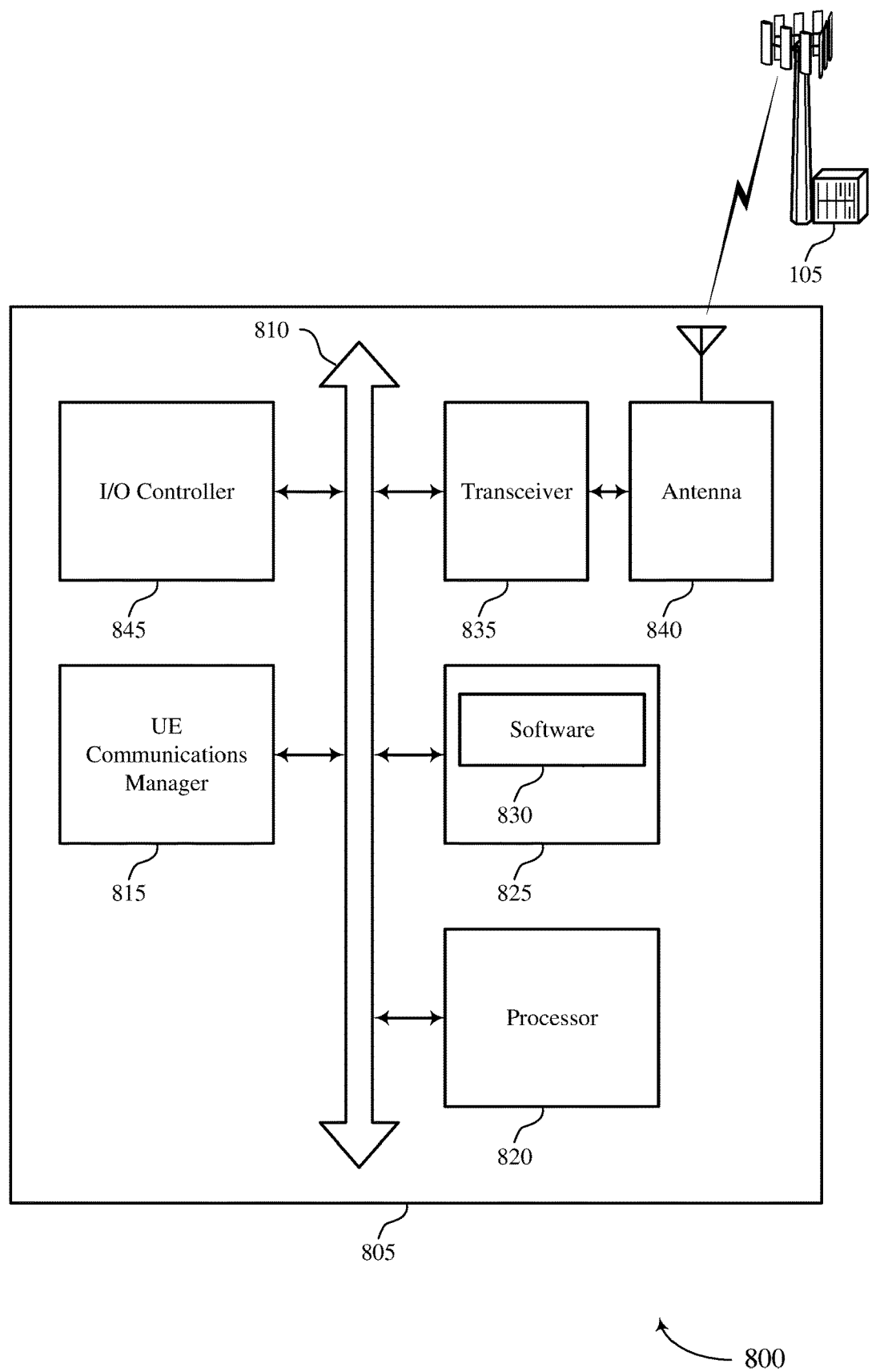
FIG. 8 illustrates a block diagram of a system including a UE that supports mmW directional discovery signal design, in accordance with one or more aspects of the present disclosure.

FIG. 8 shows a diagram of a system 800 including a device 805 that supports mmW directional discovery signal design, in accordance with one or more aspects of the present disclosure. Device 805 may be an example of or include the components of wireless device 505, wireless device 605, or a UE 115 as described herein. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting mmW directional discovery signal design).

Memory 825 may include random access memory (RAM) and read only memory (ROM). Memory 825 may store computer-readable, computer-executable software 830 including instructions that, when executed, cause the processor to perform various functions described herein. In some cases, memory 825 may contain, among other things, a basic input/output system (BIOS) which may control basic hardware or software operation such as the interaction with peripheral components or devices.

Software 830 may include code to implement aspects of the present disclosure, including code to support mmW directional discovery signal design. Software 830 may be stored in a non-transitory computer-readable medium such as system memory or other memory. In some cases, software 830 may not be directly executable by the processor but may cause a computer (e.g., when compiled and executed) to perform functions described herein.

Transceiver 835 may communicate bi-directionally, via one or more antennas, wired, or wireless links as described above. For example, transceiver 835 may represent a wireless transceiver and may communicate bi-directionally with another wireless transceiver. Transceiver 835 may also include a modem to modulate the packets and provide the modulated packets to the antennas for transmission, and to demodulate packets received from the antennas.

In some cases, the wireless device 805 may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
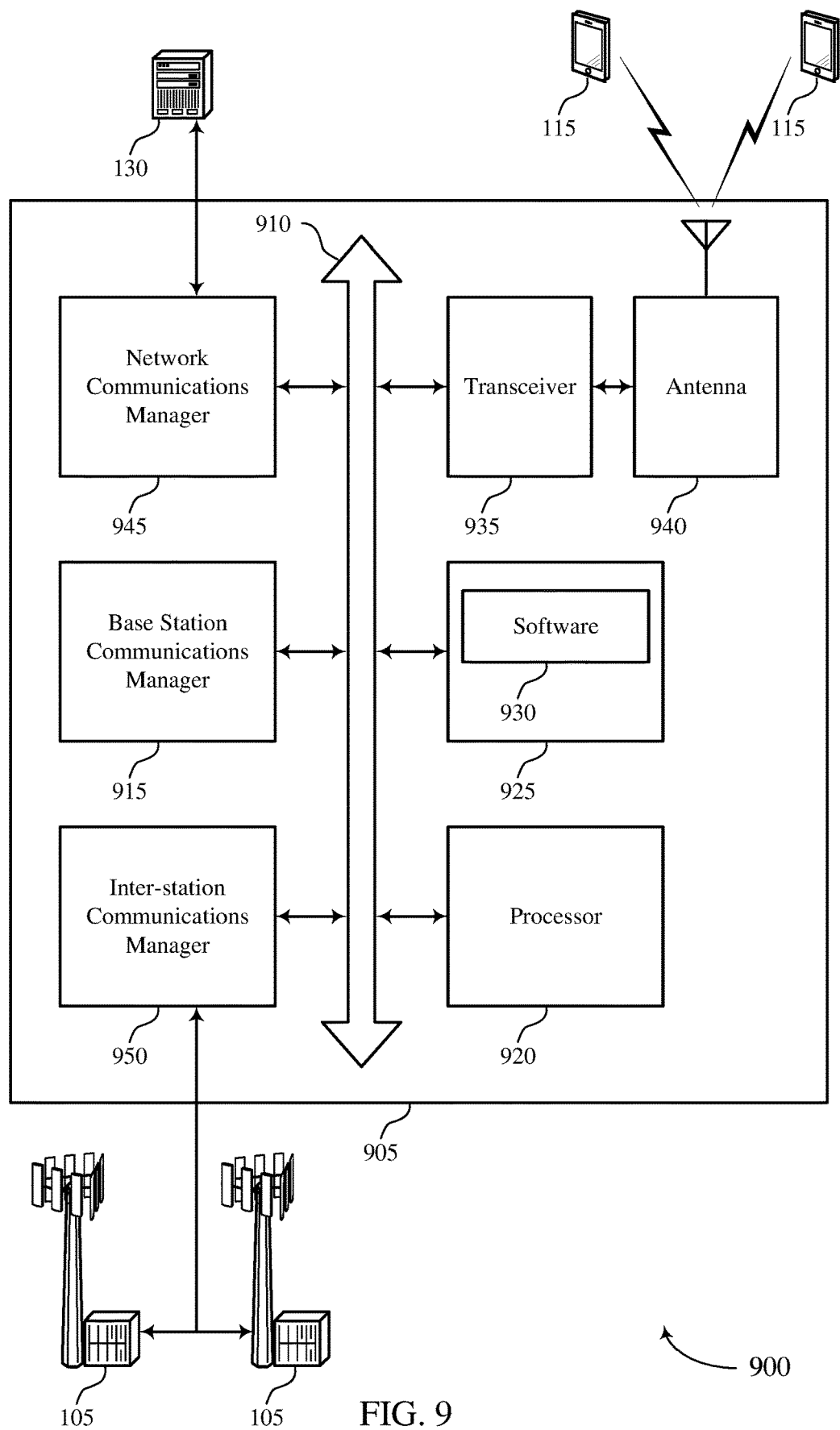
FIG. 9 illustrates a block diagram of a system including a base station that supports mmW directional discovery signal design, in accordance with one or more aspects of the present disclosure.

FIG. 9 shows a diagram of a system 900 including a device 905 that supports mmW directional discovery signal design, in accordance with one or more aspects of the present disclosure. Device 905 may be an example of or include the components of wireless device 605, wireless device 705, or a base station 105 as described herein. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting mmW directional discovery signal design).

Memory 925 may include RAM and ROM. The memory 925 may store computer-readable, computer-executable software 930 including instructions that, when executed, cause the processor to perform various functions described herein. In some cases, memory 925 may contain, among other things, a BIOS which may control basic hardware or software operation such as the interaction with peripheral components or devices.

Software 930 may include code to implement aspects of the present disclosure, including code to support mmW directional discovery signal design. Software 930 may be stored in a non-transitory computer-readable medium such as system memory or other memory. In some cases, software 930 may not be directly executable by the processor 920 but may cause a computer (e.g., when compiled and executed) to perform functions described herein.

Transceiver 935 may communicate bi-directionally, via one or more antennas, wired, or wireless links as described above. For example, transceiver 935 may represent a wireless transceiver and may communicate bi-directionally with another wireless transceiver. Transceiver 935 may also include a modem to modulate the packets and provide the modulated packets to the antennas for transmission, and to demodulate packets received from the antennas.

In some cases, the wireless device 905 may include a single antenna 940. However, in some cases the device 905 may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an Long Term Evolution (LTE)/LTE-A wireless communication network technology to provide communication between base stations 105.

Figure 10:
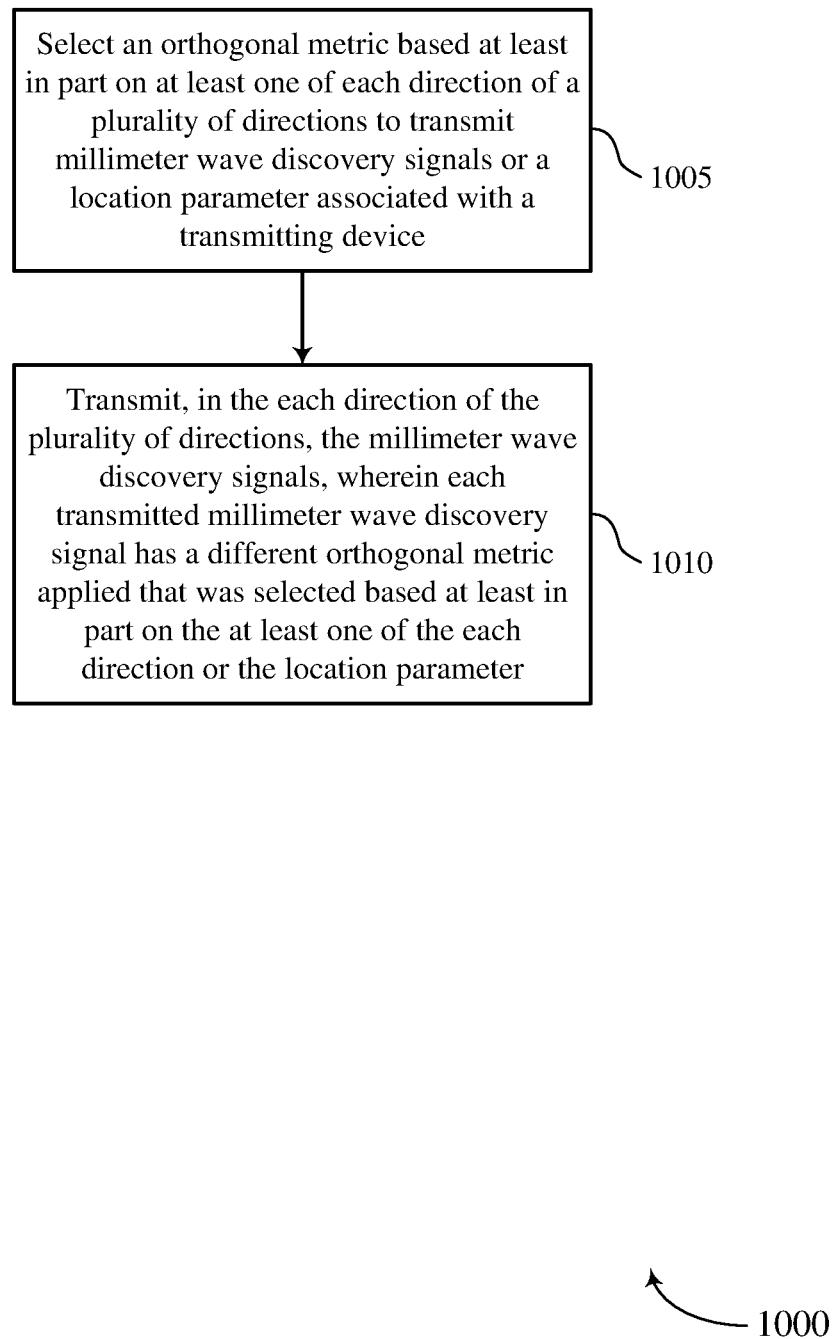
FIGS. 10 through 12 illustrate methods for mmW directional discovery signal design, in accordance with one or more aspects of the present disclosure.

FIG. 10 shows a flowchart illustrating a method 1000 for mmW directional discovery signal design, in accordance with one or more aspects of the present disclosure. The operations of method 1000 may be implemented by a UE 115 or base station 105 or its components as described herein. For example, the operations of method 1000 may be performed by communications manager 515, 615, and 715 as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1005, the UE 115 or base station 105 may select an orthogonal metric based at least in part on at least one of each direction of a plurality of directions to transmit millimeter wave discovery signals or a location parameter associated with the transmitting device. The operations of block 1005 may be performed according to the methods described herein. In certain examples, aspects of the operations of block 1005 may be performed by an orthogonal metric manager 515, 630, and 725 as described with reference to FIGS. 5 through 7.

At block 1010, the UE 115 or base station 105 may transmit, in the each direction of the plurality of directions, the millimeter wave discovery signals, wherein each transmitted millimeter wave discovery signal has a different orthogonal metric applied that was selected based at least in part on the at least one of the each direction or the location parameter. The operations of block 1010 may be performed according to the methods described herein. In certain examples, aspects of the operations of block 1010 may be performed by discovery signal manager 515, 625, and 720 as described with reference to FIGS. 5 through 7.

Figure 11:
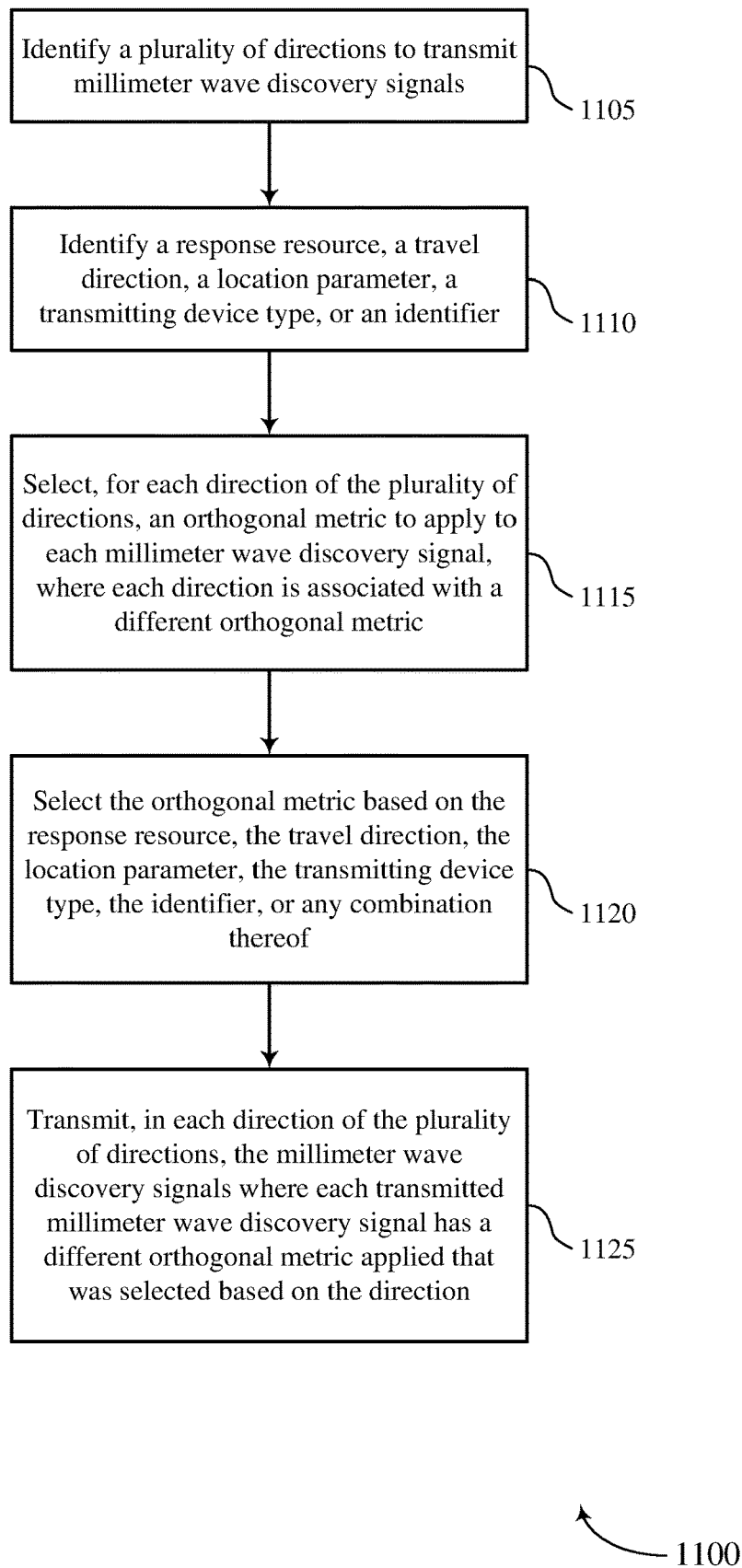

FIG. 11 shows a flowchart illustrating a method 1100 for mmW directional discovery signal design, in accordance with one or more aspects of the present disclosure. The operations of method 1100 may be implemented by a UE 115 or base station 105 or its components as described herein. For example, the operations of method 1100 may be performed by communications manager 515, 615, and 715 as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105, the UE 115 or base station 105 may identify a plurality of directions to transmit millimeter wave discovery signals. The operations of block 1105 may be performed according to the methods described herein. In certain examples, aspects of the operations of block 1105 may be performed by discovery signal manager 515, 625, and 720 as described with reference to FIGS. 5 through 7.

At block 1110, the UE 115 or base station 105 may identify a response resource, a travel direction, a location parameter, a transmitting device type, and an identifier. The operations of block 1110, may be performed according to the methods described herein. In certain examples, aspects of the operations of block 1110 may be performed by orthogonal metric selection manager 515, 615, and 730 as described with reference to FIGS. 5 through 7.

At block 1115, the UE 115 or base station 105 may select, for each direction of the plurality of directions, an orthogonal metric to apply to each millimeter wave discovery signal, wherein each direction is associated with a different orthogonal metric. The operations of block 1115 may be performed according to the methods described herein. In certain examples, aspects of the operations of block 1115 may be performed by orthogonal metric manager 515, 630, and 725 as described with reference to FIGS. 5 through 7.

At block 1120, the UE 115 or base station 105 may select the orthogonal metric based at least in part on the response resource, the travel direction, the location parameter, the transmitting device type, the identifier, or any combination thereof. The operations of block 1120 may be performed according to the methods described herein. In certain examples, aspects of the operations of block 1120 may be performed by orthogonal metric selection manager 515, 615, and 730 as described with reference to FIGS. 5 through 7.

At block 1125, the UE 115 or base station 105 may transmit, in each direction of the plurality of directions, the millimeter wave discovery signals wherein each transmitted millimeter wave discovery signal has a different orthogonal metric applied that was selected based on the direction. The operations of block 1125 may be performed according to the methods described herein. In certain examples, aspects of the operations of block 1125 may be performed by discovery signal manager 515, 625, and 720 as described with reference to FIGS. 5 through 7.

Figure 12:
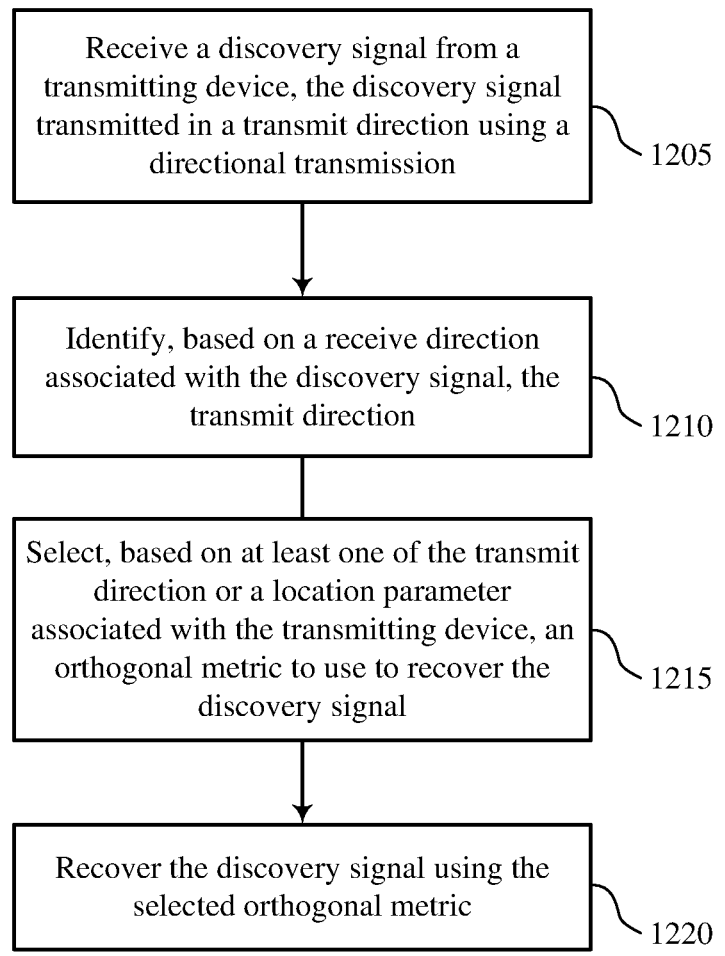

FIG. 12 shows a flowchart illustrating a method 1200 for mmW directional discovery signal design, in accordance with one or more aspects of the present disclosure. The operations of method 1200 may be implemented by a UE 115 or base station 105 or its components as described herein. For example, the operations of method 1200 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205, the UE 115 or base station 105 may receive a discovery signal from a transmitting device, the discovery signal transmitted in a transmit direction using a directional transmission. The operations of block 1205 may be performed according to the methods described herein. In certain examples, aspects of the operations of block 1205 may be performed by discovery signal manager 515, 625, and 720 as described with reference to FIGS. 5 through 7.

At block 1210, the UE 115 or base station 105 may identify, based at least in part on a receive direction associated with the discovery signal, the transmit direction. The operations of block 1210 may be performed according to the methods described herein. In certain examples, aspects of the operations of block 1210 may be performed by discovery signal manager 515, 625, and 720 as described with reference to FIGS. 5 through 7.

At block 1215, the UE 115 or base station 105 may select, based at least in part on the transmit direction, an orthogonal metric to use to recover the discovery signal. The operations of block 1215 may be performed according to the methods described herein. In certain examples, aspects of the operations of block 1215 may be performed by a orthogonal metric manager as described with reference to FIGS. 5 through 7.

At block 1220, the UE 115 or base station 105 may recover the discovery signal using the selected orthogonal metric. The operations of block 1220 may be performed according to the methods described herein. In certain examples, aspects of the operations of block 1220 may be performed by a orthogonal metric manager as described with reference to FIGS. 5 through 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3 GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNB s, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a receiving device, the method comprising:
receiving a discovery signal from a transmitting device, the discovery signal transmitted in a transmit direction using a directional transmission;
identifying, based at least in part on an angle of arrival associated with the discovery signal, the transmit direction;
selecting, based at least in part on the transmit direction and a location parameter associated with the transmitting device, an orthogonal metric to be used to recover the discovery signal; and
recovering the discovery signal using the selected orthogonal metric.

2. The method of claim 1, further comprising:
identifying an additional location parameter associated with the receiving device, wherein the orthogonal metric is selected further based at least in part on the additional location parameter.

3. The method of claim 1, further comprising:
identifying a travel direction associated with the receiving device, wherein the orthogonal metric is selected further based at least in part on the travel direction.

4. The method of claim 1, further comprising:
identifying a receiving device type associated with the receiving device, wherein the orthogonal metric is selected further based at least in part on the receiving device type.

5. The method of claim 1, further comprising:
identifying an additional location parameter, a travel direction, and a receiving device type associated with the receiving device, wherein the orthogonal metric is selected further based at least in part on the additional location parameter, the travel direction, the receiving device type, or any combination thereof.

6. The method of claim 1, further comprising:
identifying a temporary identifier associated with the transmitting device and a duration parameter associated with the temporary identifier; and
transmitting a signal to the transmitting device based at least in part on the identified temporary identifier and the duration parameter.

7. The method of claim 1, further comprising:
generating a temporary identifier associated with the receiving device;
determining a duration parameter associated with the temporary identifier; and
transmitting a signal to the transmitting device, the signal indicating the temporary identifier and the duration parameter associated with the receiving device.

8. An apparatus for wireless communication at a receiving device, the apparatus comprising:
a processor; and
memory coupled with the processor, the processor and memory configured to:
receive a discovery signal from a transmitting device, the discovery signal transmitted in a transmit direction using a directional transmission;
identify, based at least in part on an angle of arrival associated with the discovery signal, the transmit direction;
select, based at least in part on the transmit direction and a location parameter associated with the transmitting device, an orthogonal metric to be used to recover the discovery signal; and
recover the discovery signal using the selected orthogonal metric.

9. The apparatus of claim 8, wherein the processor and memory are further configured to:
identify an additional location parameter associated with the receiving device, wherein the processor and memory configured to select the orthogonal metric are configured to select the orthogonal metric further based at least in part on the additional location parameter.

10. The apparatus of claim 8, wherein the processor and memory are further configured to:
identify a travel direction associated with the receiving device, wherein the processor and memory configured to select the orthogonal metric are configured to select the orthogonal metric further based at least in part on the travel direction.

11. The apparatus of claim 8, wherein the processor and memory are further configured to:
identify a receiving device type associated with the receiving device, wherein the processor and memory configured to select the orthogonal metric are configured to select the orthogonal metric further based at least in part on the receiving device type.

12. The apparatus of claim 8, wherein the processor and memory are further configured to:
identify an additional location parameter, a travel direction, and a receiving device type associated with the receiving device, wherein the processor and memory configured to select the orthogonal metric are configured to select the orthogonal metric further based at least in part on the additional location parameter, the travel direction, the receiving device type, or any combination thereof.

13. The apparatus of claim 8, wherein the processor and memory are further configured to:
identify a temporary identifier associated with the transmitting device and a duration parameter associated with the temporary identifier; and
transmit a signal to the transmitting device based at least in part on the identified temporary identifier and the duration parameter.

14. The apparatus of claim 8, wherein the processor and memory are further configured to:
generate a temporary identifier associated with the receiving device;
determine a duration parameter associated with the temporary identifier; and
transmit a signal to the transmitting device, the signal indicating the temporary identifier and the duration parameter associated with the receiving device.

15. A non-transitory computer-readable medium for wireless communication at a receiving device having stored thereon instructions operable to cause a processor to:
receive a discovery signal from a transmitting device, the discovery signal transmitted in a transmit direction using a directional transmission;

identify, based at least in part on an angle of arrival associated with the discovery signal, the transmit direction;

select, based at least in part on the transmit direction and a location parameter associated with the transmitting device, an orthogonal metric to be used to recover the discovery signal; and recover the discovery signal using the selected orthogonal metric.

16. The non-transitory computer-readable medium of claim 15, wherein the instructions are further operable to cause the processor to:

identify an additional location parameter associated with the receiving device, wherein the orthogonal metric is selected further based at least in part on the additional location parameter.

17. The non-transitory computer-readable medium of claim 15, wherein the instructions are further operable to cause the processor to:

identify a travel direction associated with the receiving device, wherein the orthogonal metric is selected further based at least in part on the travel direction.

18. The non-transitory computer-readable medium of claim 15, wherein the instructions are further operable to cause the processor to:

identify a receiving device type associated with the receiving device, wherein the orthogonal metric is selected further based at least in part on the receiving device type.

19. The non-transitory computer-readable medium of claim 15, wherein the instructions are further operable to cause the processor to:

identify an additional location parameter, a travel direction, and a receiving device type associated with the receiving device, wherein the orthogonal metric is selected further based at least in part on the additional location parameter, the travel direction, the receiving device type, or any combination thereof.

20. The non-transitory computer-readable medium of claim 15, wherein the instructions are further operable to cause the processor to:

identify a temporary identifier associated with the transmitting device and a duration parameter associated with the temporary identifier; and transmit a signal to the transmitting device based at least in part on the identified temporary identifier and the duration parameter.

21. The non-transitory computer-readable medium of claim 15, wherein the instructions are further operable to cause the processor to:

generate a temporary identifier associated with the receiving device;

determine a duration parameter associated with the temporary identifier; and transmit a signal to the transmitting device, the signal indicating the temporary identifier and the duration parameter associated with the receiving device.

22. An apparatus for wireless communication at a receiving device, the apparatus comprising:

means for receiving a discovery signal from a transmitting device, the discovery signal transmitted in a transmit direction using a directional transmission;

means for identifying, based at least in part on an angle of arrival associated with the discovery signal, the transmit direction;

means for selecting, based at least in part on the transmit direction and a location parameter associated with the transmitting device, an orthogonal metric to be used to recover the discovery signal; and means for recovering the discovery signal using the selected orthogonal metric.

* * * * *